(12) United States Patent
Matsuda et al.

(10) Patent No.: US 8,845,472 B2
(45) Date of Patent: Sep. 30, 2014

(54) DRIVE TRANSMISSION UNIT AND IMAGE FORMING APPARATUS INCLUDING SAME

(75) Inventors: Hiromichi Matsuda, Kanagawa (JP);
Katsuaki Miyawaki, Kanagawa (JP);
Tetsuo Watanabe, Kanagawa (JP);
Yasuhiro Maehata, Tokyo (JP); Keisuke Shimizu, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 171 days.

(21) Appl. No.: 13/556,475

(22) Filed: Jul. 24, 2012

(65) Prior Publication Data

US 2013/0065725 A1    Mar. 14, 2013

(30) Foreign Application Priority Data

Sep. 8, 2011 (JP) ................................. 2011-196105

(51) Int. Cl.
*F16H 57/04* (2010.01)
*G03G 15/00* (2006.01)

(52) U.S. Cl.
CPC ...... *G03G 15/757* (2013.01); *G03G 2221/1657* (2013.01); *G03G 21/16473* (2013.01)
USPC .............................. 475/159; 475/149; 475/337

(58) Field of Classification Search
USPC ........................... 475/149, 159, 337; 399/167
See application file for complete search history.

(56) References Cited

U.S. PATENT DOCUMENTS

| | | | | |
|---|---|---|---|---|
| 2,469,905 A | * | 5/1949 | Tatlow | 475/337 |
| 3,776,067 A | * | 12/1973 | DeBruyne et al. | 475/159 |
| 4,365,525 A | * | 12/1982 | Imazaike | 475/337 |
| 6,857,984 B2 | * | 2/2005 | Imanishi et al. | 475/149 |
| 7,022,039 B2 | * | 4/2006 | Hasegawa et al. | 475/159 |
| 2009/0017953 A1 | | 1/2009 | Uehara et al. | |
| 2011/0158711 A1 | * | 6/2011 | Fukushima | 399/297 |
| 2011/0293328 A1 | * | 12/2011 | Matsuda et al. | 399/167 |
| 2012/0263497 A1 | * | 10/2012 | Nakura et al. | 399/167 |

FOREIGN PATENT DOCUMENTS

| | | |
|---|---|---|
| JP | 6-018748 | 3/1994 |
| JP | 2004-219836 | 8/2004 |
| JP | 2006-307909 | 11/2006 |
| JP | 2006-307910 | 11/2006 |
| JP | 2009-037198 | 2/2009 |
| JP | 2010-216535 | 9/2010 |

* cited by examiner

*Primary Examiner* — Jacob S Scott (74) *Attorney, Agent, or Firm* — Oblon, Spivak, McClelland, Maier & Neustadt, L.L.P.

(57) ABSTRACT

A drive transmission unit includes a planetary gear mechanism. The planetary gear mechanism includes an outer gear rotatably disposed on a shaft, a sun gear rotated by a power source, coaxially disposed on the same shaft as the outer gear, multiple planetary gears to engage the sun gear and the outer gear, disposed along an inner circumferential surface of the outer gear, a carrier rotatable on the same shaft as the outer gear to rotatably support the planetary gears, a contact member that contacts the sun gear as the sun gear moves in a direction of thrust due to engagement with the plurality of planetary gears, and a grease retaining portion to retain grease near a contact portion at which the sun gear contacts the contact member as the sun gear moves in the direction of thrust. The outer gear, the sun gear, and the planetary gears are helical gears.

12 Claims, 8 Drawing Sheets

DRIVE TRANSMISSION UNIT AND IMAGE FORMING APPARATUS INCLUDING SAME

CROSS-REFERENCE TO RELATED APPLICATION

This patent application is based on and claims priority pursuant to 35 U.S.C. §119 to Japanese Patent Application No. 2011-196105, filed on Sep. 8, 2011 in the Japanese Patent Office, the entire disclosure of which is hereby incorporated by reference herein.

BACKGROUND OF THE INVENTION

1. Field of the Invention

Exemplary aspects of the present invention generally relate to a drive transmission unit and an image forming apparatus including the drive transmission unit, and more particularly to an image forming apparatus such as a copier, a facsimile machine, a printer, or a multi-functional system including a combination thereof 2. Description of the Related Art Related-art image forming apparatuses, such as copiers, facsimile machines, printers, or multifunction printers having at least one of copying, printing, scanning, and facsimile capabilities, typically form an image on a recording medium according to image data. Thus, for example, a charger uniformly charges a surface of an image bearing member (which may, for example, be a photoconductive drum); an optical writer projects a light beam onto the charged surface of the image bearing member to form an electrostatic latent image on the image bearing member according to the image data; a developing device supplies toner to the electrostatic latent image formed on the image bearing member to render the electrostatic latent image visible as a toner image; the toner image is directly transferred from the image bearing member onto a recording medium or is indirectly transferred from the image bearing member onto a recording medium via an intermediate transfer member; a cleaning device then cleans the surface of the image carrier after the toner image is transferred from the image carrier onto the recording medium; finally, a fixing device applies heat and pressure to the recording medium bearing the unfixed toner image to fix the unfixed toner image on the recording medium, thus forming the image on the recording medium.

The image bearing member is rotated by a drive source such as a motor. Generally, the speed of the drive source is greater than the target speed of the image bearing member. Thus, a planetary gear decelerator is used to reduce the speed of rotation of the drive source so that the reduced speed is transmitted to the image bearing member.

Typically, known planetary gear decelerators consist of a sun gear, an outer gear, a plurality of planetary gears, and a carrier. The sun gear receives torque from the drive source and rotates. The outer gear is coaxially provided to the same shaft as the sun gear and fixed immovably to the planetary gear decelerator. The plurality of planetary gears is disposed equally spaced around the inner circumference thereof and engages the sun gear and the outer gear. The carrier is rotatable on the same shaft as the sun gear and the outer gear, and rotatively supports the planetary gears. Accordingly, the carrier outputs the torque at a reduced speed.

Helical gears are used for the outer gear, the sun gear, and the planetary gears to increase contact ratio, reduce fluctuation of the speed of a meshing cycle, and reduce noise.

A helical gear is a gear with teeth which are set at an angle relative to the axis of rotation. Thus, as the sun gear rotates, a thrust load is generated in the direction of the rotation axis (thrust direction) between the sun gear and the planetary gears, and between the outer gear and the planetary gears in the planetary gear decelerator. The planetary gears do not shift in the direction of the thrust because the direction of thrust load due to engagement of the planetary gears and the sun gear is opposite to the direction of thrust load due to engagement of the planetary gears and the outer gear, thereby canceling out the thrust loads.

As for the outer gear, even when the outer gear moves in the direction of thrust due to engagement with the planetary gears and contacts an adjacent device in the direction of thrust, the outer gear does not get abraded because the outer gear itself does not rotate. Accordingly, loss of power and abrasion due to heat do not occur.

However, if the sun gear shifts in the direction of thrust due to engagement with the planetary gears and hence comes into contact with a partner member opposite the sun gear in the direction of thrust, the sun gear contacts the partner member while rotating. As a result, loss of power and abrasion occur due to rotational friction at the contact portion where the sun gear and the partner member contact.

In view of the above, Japanese Patent No. 4590299 proposes a planetary gear decelerator in which the sun gear is supported by a fixing member via a shaft bearing to prevent the sun gear from shifting in the direction of thrust. In this configuration, the sun gear is prevented from contacting the partner member. However, power must be maintained even when the thrust load is applied to the shaft bearing via the sun gear, and such a shaft bearing is generally expensive.

In another approach, according to JP-2006-307909-A, a portion of the sun gear that contacts the partner member is made spherical. In this configuration, the area of contact with the partner member is reduced, and thus loss of power and abrasion due to rotational friction can be prevented.

Although advantageous and generally effective for its intended purpose, the portion of the sun gear having the spherical surface gets abraded after extended use, causing loss of power and abrasion. Moreover, according to the results of experiments performed by the present inventors, even when grease was supplied to the spherical portion of the sun gear, the grease spattered due to the centrifugal force of rotation of the sun gear, and hence abrasion of the spherical portion of the sun gear was not prevented.

BRIEF SUMMARY OF THE INVENTION

In view of the foregoing, in an aspect of this disclosure, there is provided an improved drive transmission unit including a planetary gear mechanism. The planetary gear mechanism includes an outer gear, a sun gear, a plurality of planetary gears, a carrier, a contact member, and a grease retaining portion. The outer gear is rotatably disposed on a shaft. The sun gear is rotated by a power source and coaxially disposed on the same shaft as the outer gear. The plurality of planetary gears is disposed along an inner circumferential surface of the outer gear and engages the sun gear and the outer gear. The carrier is rotatable on the same shaft as the sun gear and the outer gear, and rotatably supports the planetary gears. The contact member contacts the sun gear as the sun gear moves in a direction of thrust due to engagement with the plurality of planetary gears. The grease retaining portion retains grease near a contact portion at which the sun gear contacts the contact member as the sun gear moves in the direction of thrust due to engagement with the plurality of planetary gears. The outer gear, the sun gear, and the plurality of planetary gears are helical gears.

In another aspect of this disclosure, there is provided an image forming apparatus including a rotary member, a power source to drive the rotary member, and the drive transmission unit to transmit torque from the power source to the rotary member.

The aforementioned and other aspects, features and advantages would be more fully apparent from the following detailed description of illustrative embodiments, the accompanying drawings and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION OF DISCLOSED EMBODIMENTS

A description is now given of illustrative embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but include other printable media as well.

Figure 1:
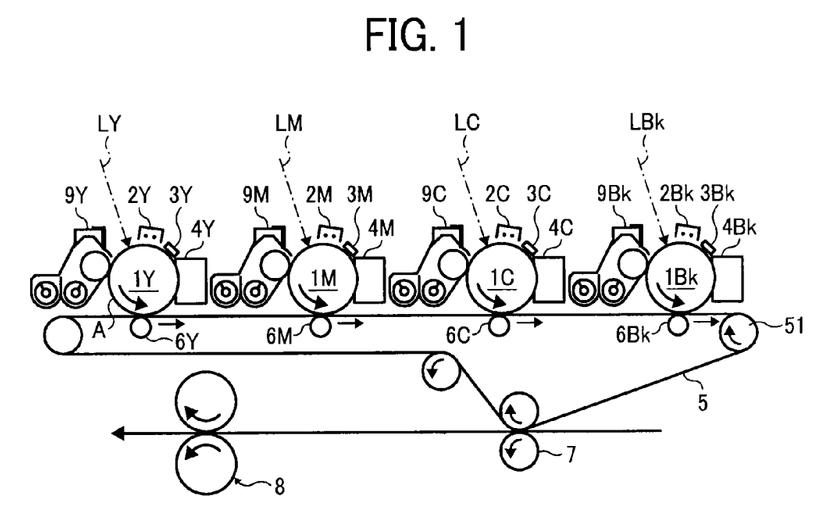
FIG. 1 is a schematic diagram illustrating a copier as an example of the image forming apparatus according to an illustrative embodiment of the present invention.

Referring now to the drawings, wherein like reference numerals designate identical or corresponding parts throughout the several views, and initially with reference to FIG. 1, a description is provided of an image forming apparatus according to an aspect of this disclosure.

FIG. 1 is a schematic diagram illustrating a copier as an example of the image forming apparatus according to an illustrative embodiment of the present invention.

The image forming apparatus receives image data including image information from an image reading unit and performs image forming operation. As illustrated in FIG. 1, the image forming apparatus includes four photosensitive drums 1Y, 1M, 1C, and 1Bk each serving as a latent image bearing member, arranged in tandem along an intermediate transfer belt 5.

It is to be noted that the suffixes Y, M, C, and Bk denote colors yellow, magenta, cyan, and black, respectively. To simplify the description, the suffixes Y, M, C, and Bk indicating colors are omitted herein, unless otherwise specified.

As illustrated in FIG. 1, the intermediate transfer belt 5 is formed into a loop and entrained around a plurality of rollers including a drive roller 51. The photosensitive drums 1Y, 1M, 1C, and 1Bk are arranged in tandem along the direction of movement of the intermediate transfer belt 5 and contact the intermediate transfer belt 5.

The photosensitive drums 1Y, 1M, 1C, and 1Bk are surrounded by various imaging equipment. For example, charging devices 2Y, 2M, 2C, and 2Bk, developing devices 9Y, 9M, 9C, and 9Bk, cleaning devices 4Y, 4M, 4C, and 4Bk, and charge erasing lamps 3Y, 3M, 3C, and 3Bk are respectively provided around the photosensitive drums 1Y, 1M, 1C, and 1Bk in the order of electrophotographic process. However, the order of arrangement is not limited to this.

The photosensitive drum 1, the charging device 2, the charge erasing lamp 3, the cleaning device 4, and the developing device 9 constitute a single integrated process cartridge detachably attachable relative to a main body of the image forming apparatus.

According to the illustrative embodiment, when forming a color image, the photosensitive drum 1Y is rotated in the direction indicated by arrow A by a photosensitive drum driving device described later and charged uniformly by the charging device 2Y while rotating. Subsequently, the photosensitive drum 1Y is illuminated with a light beam LY from an optical writing unit, thereby forming an electrostatic latent image of yellow on the surface of the photosensitive drum 1Y.

The electrostatic latent image of yellow on the photosensitive drum 1Y is developed with yellow toner by the developing device 9Y, thereby forming a visible image, also known as a toner image. Upon development, a predetermined developing bias is supplied between a developing roller of the developing device 9Y and the photosensitive drum 1Y so that the yellow toner on the developing roller is attracted electrostatically to the electrostatic latent image on the photosensitive drum 1Y.

Subsequently, as the photosensitive drum 1Y rotates, the toner image of yellow formed on the surface of the photosensitive drum 1Y arrives at a primary transfer position at which the photosensitive drum 1Y contacts the intermediate transfer belt 5. At the primary transfer position, the predetermined bias voltage is supplied to the rear surface of the intermediate transfer belt 5 by a primary transfer roller 6Y disposed inside the looped intermediate transfer belt 5, across from the photosensitive drum 1Y. Application of the bias voltage generates a primary transfer electric field which causes the yellow toner image on the photosensitive drum 1Y to move to the intermediate transfer belt 5. This process is known as primary transfer.

Similar to the toner image of yellow, toner images of magenta, cyan, and black are formed on the photosensitive drums 1M, 1C, and 1Bk, respectively, and transferred onto the intermediate transfer belt 5 such that they are superimposed one atop the other. Accordingly, a composite toner image is formed on the intermediate transfer belt 5.

Subsequently, the composite toner image formed on the intermediate transfer belt 5 is delivered to a secondary transfer position facing a secondary transfer roller 7, as the intermediate transfer belt 5 rotates. A transfer sheet such as a recording medium is fed to the secondary transfer position by a pair of registration rollers in an appropriate timing such that the transfer sheet is aligned with the composite toner image formed on the intermediate transfer belt 5. At the secondary transfer position, the secondary transfer roller 7 supplies a predetermined bias voltage to the rear surface of the transfer sheet, thereby generating a secondary transfer electric field.

The toner image on the intermediate transfer belt 5 is transferred onto the transfer sheet due to the secondary electric field and pressure applied at the secondary transfer position. Subsequently, the transfer sheet, on which the composite toner image is secondarily transferred, is delivered between a pair of fixing rollers 8. The toner image is fixed onto the transfer sheet by heat and pressure applied by the pair of the fixing rollers 8 as the transfer sheet passes between the fixing rollers 8.

Figure 2:
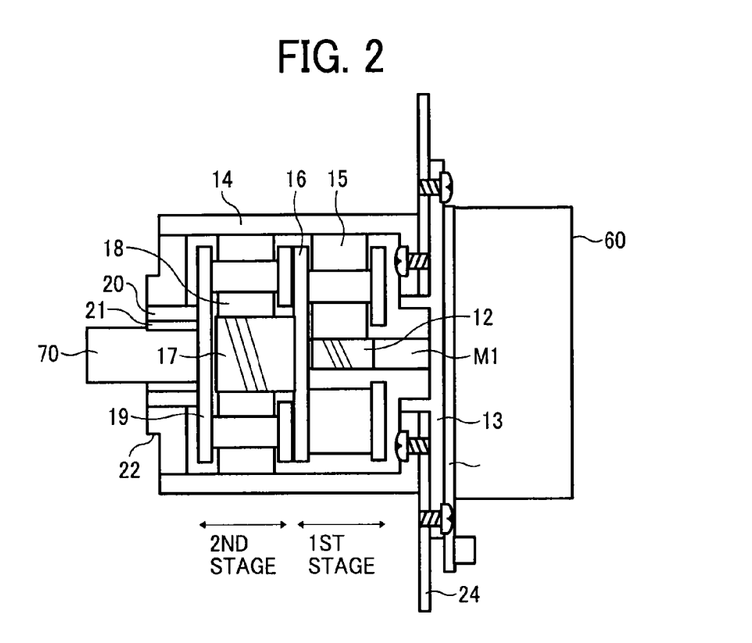
FIG. 2 is a cross-sectional view schematically illustrating a planetary gear mechanism for driving a photosensitive drum employed in the image forming apparatus of FIG. 1.
Figure 3:
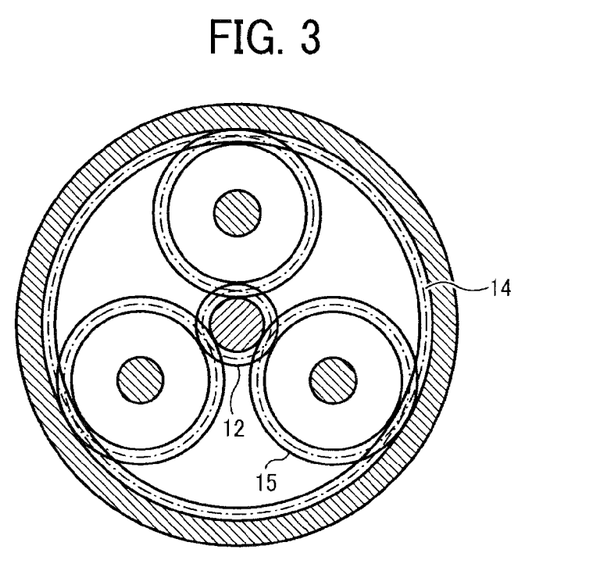
FIG. 3 is a cross-sectional view schematically illustrating a first stage of the planetary gear mechanism of FIG. 2.
Figure 4:
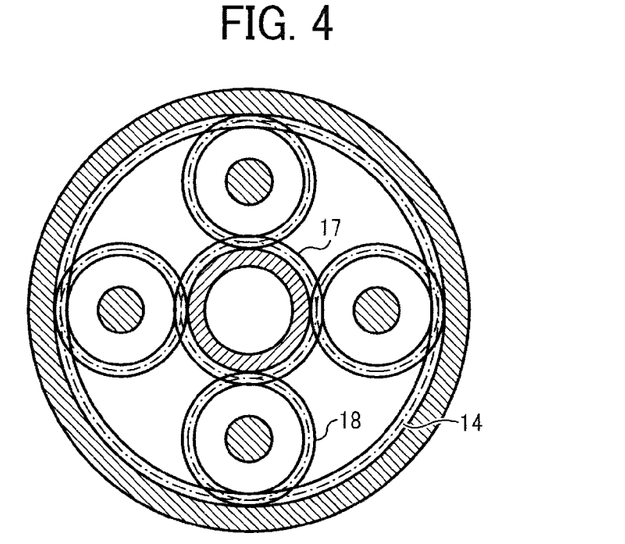
FIG. 4 is a cross-sectional view schematically illustrating a second stage of the planetary gear mechanism of FIG. 2.

With reference to FIGS. 2 through 4, a description is provided of a drive transmission unit that transmits rotary power from a motor 60 serving as a drive source to the photosensitive drums 1. FIG. 2 is a cross-sectional view schematically illustrating the drive transmission unit. FIG. 3 is a cross-sectional view schematically illustrating a first stage of a planetary gear mechanism. FIG. 4 is a cross-sectional view schematically illustrating a second stage of the planetary gear mechanism.

A planetary gear decelerator employed in the drive transmission unit illustrated in FIG. 2 employs a two-stage 2K-H type planetary gear mechanism. The planetary gear decelerator can be used in the drive transmission unit for the driving roller of the intermediate transfer belt 5, the fixing roller, and so forth.

Precise control of rotation speed of the photosensitive drum 1 and the intermediate transfer belt 5 is required in the image forming apparatus. More specifically, the photosensitive drum 1 and the intermediate transfer belt 5 are rotated at a precise constant speed. If the speed of rotation of the photosensitive drum 1 and the intermediate transfer belt 5 fluctuates, imaging failure such as jitter and unevenness of image density occurs. Furthermore, if the rotation speed continues to fluctuate at a certain frequency, unevenness of image density appears periodically over the entire image as banding or stripes on an output image.

Fluctuation of the rotation speed of the photosensitive drum 1 in particular causes n optical writing system sub-scanning exposure misalignment. At the same time, fluctuation of the rotation speed of the photosensitive drum 1 causes deviation of the sub-scanning position on the intermediate transfer belt 5 at primary transfer. Fluctuation of the rotation speed of the intermediate transfer belt 5 in turn causes deviation of sub-scanning position both at the primary transfer and the secondary transfer. The banding derived from such fluctuation of the rotation speed degrades imaging quality significantly.

In view of the above, high-precision operation is required of the photosensitive drums 1 and the intermediate transfer belt 5. Thus, a plastic gear is used in the drive transmission unit of the photosensitive drums 1 and the intermediate transfer belt 5. The plastic gear is made through injection molding in which molten resin is injected into a mold. As compared with a metal gear, the plastic gear itself has lubricating properties, hence generating less noise during operation, and it is lightweight. Furthermore, the plastic gear is highly resistant to corrosion and easy to mass-produce.

Although advantageous, the plastic gear has some disadvantages in terms of its durability, stiffness, and tolerances. Thus, as will be described in detail later, according to the illustrative embodiment, the planetary gear decelerator is used to enhance durability and stiffness of the drive transmission unit using the plastic gear. More specifically, the planetary gear mechanism employed in the planetary gear decelerator can increase durability and stiffness of the drive transmission unit because output shaft rotational load is dispersed and transmitted by a plurality of planetary gears. Furthermore, employing the planetary gear mechanism as the drive transmission unit can reduce gear size compared with a gear assembly using a gear train, thereby making the size of the image forming apparatus as a whole as compact as is usually desired.

In the image forming apparatus, when the planetary gear mechanism is employed as the drive transmission unit of the photosensitive drum having a diameter in a range of from 30 mm to 100 mm, which is a typical photosensitive drum, a deceleration ratio of approximately 1/20 is required. According to the present illustrative embodiment, such a large deceleration ratio can be achieved by using the two-stage 2K-H type planetary gear mechanism described above as the drive transmission unit.

With reference to FIG. 2, a description is provided of the planetary gear mechanism. As illustrated in FIG. 2, the planetary gear mechanism includes a first sun gear 12 disposed on a rotary shaft M1 of the motor 60, a gear mount 24, an outer gear 14, a plurality of first planetary gears 15 of a first stage, a first carrier 16 of the first stage, and so forth. The outer gear 14 is fixed to the gear mount 24. The rotary shaft M1 serves as a power output member. The plurality of first planetary gears 15 engages the first sun gear 12 and the outer gear 14. The plurality of first planetary gears 15 is supported by the first carrier 16 and revolves around the periphery of the sun gear.

According to the present illustrative embodiment, at least three first planetary gears 15 are concentrically disposed for rotation balance and load dispersal. According to the present embodiment, as illustrated in FIG. 3, the first planetary gears 15 are evenly disposed at each of three positions around an inner circumference of the outer gear 14.

The plurality of first planetary gears 15 engages the first sun gear 12 and the outer gear 14 so that each of the first planetary gears 15 rotates while revolving around the first sun gear 12. The first carrier 16 supporting the first planetary gears 15 rotates slower than the first sun gear 12, thereby obtaining the desired deceleration ratio of the first stage.

Next, a second sun gear 17 serves as a sun gear for the second stage and as an input for the second stage of the deceleration mechanism. The second sun gear 17 is provided at the center of rotation of the first carrier 16. It is to be noted that the first carrier 16 does not include a rotary supporting portion, thereby allowing the first carrier 16 to freely float (rotate).

Similar to the first planetary gears 15, a plurality of second planetary gears 18 serving as planetary gears for the second stage engages the outer gear 14 extending from the first stage and is supported by a second carrier 19 of the second stage. The plurality of second planetary gears 18 revolves around the periphery of the second sun gear 17. According to the present illustrative embodiment, as illustrated in FIG. 4, the second planetary gears 18 are evenly disposed at each of four positions around an inner circumference of the outer gear 14.

The second carrier 19 of the second stage which is the last stage is provided with an output portion including a cylindrical-shaped shaft 20 serving as an output axis, the inner surface of which includes spline teeth.

As will be described later, a drum shaft 70 penetrates through the process cartridge to support the photosensitive drum 1. The drum shaft 70 includes a spline portion 21 serving as an output portion having spline teeth on an outer surface thereof to engage the inner teeth (spline teeth) of the cylindrical-shaped shaft 20.

According to the above-described illustrative embodiment, a set of four kinds of parts, the sun gear, the planetary gear, the planetary carrier, and the outer gear, constitutes the 2K-H type planetary gear mechanism.

One of three elements of rotation, that is, rotation of the sun gear, revolution of the planetary gears (rotation of the carrier), and rotation of the outer gear, is fixed, and remaining two elements are each connected to the input and the output. With this configuration, the deceleration ratio and the direction of rotation can be switched between different deceleration ratios and directions of rotation depending on designation of each element, that is, according to which element is fixed and which element is connected to the input or the output.

The two-stage 2K-H type planetary gear mechanism is classified as a composite planetary gear mechanism including at least two sets of 2K-H type planetary gear mechanisms. In the composite planetary gear mechanism, among three elements, the gears having the same element are either connected or fixed. The remaining two elements are each connected to the input and the output.

The planetary gear mechanism of the illustrative embodiment is a planetary type mechanism in which the outer gear is fixed, the sun gear serves as the input axis, and the carrier serves as the output axis. The direction of rotation of the input axis is the same as that of the output axis.

More specifically, power from the motor 60 is transmitted from the motor shaft M1 to the first sun gear 12, thereby rotating the first sun gear 12. Due to rotation of the first sun gear 12, three first planetary gears 15 engaging the first sun gear 12 and themselves rotate while revolving around the first sun gear 12. Due to revolution of the first planetary gears 15 around the first sun gear 12, a decelerated driving force is transmitted to the first carrier 16, thereby rotating the first carrier 16 and hence causing the second sun gear 17 provided to the first carrier 16 to rotate.

Subsequently, power is transmitted to the four second planetary gears 18 engaging the second sun gear 17. Accordingly, the second planetary gears 18 rotate while revolving around the second sun gear 17. Due to revolution of the secondary planetary gears 18, the driving force is decelerated and transmitted to the second carrier 19 and then to the photosensitive drum 1 via the cylindrical-shaped shaft 20 and the drum shaft 70 provided to the second carrier 19. Accordingly, the photosensitive drum 1 is rotated at a predetermined speed.

The deceleration ratio of a single-stage planetary gear mechanism is expressed by the following equation:

$$\text{Deceleration Ratio} = Za1/(Za1+Zc1)$$

where $Za$ is a number of teeth of the sun gear, $Zb$ is a number of teeth of the planetary gear, and $Zc$ is a number of teeth of the outer gear. In the equation, "1" represents the first stage.

The deceleration ratio of a planetary gear mechanism having two stages is a product of the deceleration ratio of the first stage and that of the second stage. Both the first and the second stages of the planetary gear mechanism of the illustrative embodiment are the planetary type. Thus, the deceleration ratio is expressed by the following equation:

$$\text{Deceleration Ratio} = Za1/(Za1+Zc1) \times Za2/(Za2+Zc2)$$

In this equation, "1" represents the first stage and "2" represents the second stage.

It is to be noted that the rotary shaft M1 of the motor 60 is supported by a motor mount 13 via two shaft bearings. The motor mount may be a flange. By supporting the rotary shaft M1 of the motor 60, an outer rotor of a brush-less direct current (DC) motor is also supported. A stator core of the motor 60, a motor driving circuit, and so forth are also disposed on the motor mount 13.

The first sun gear 12 is formed on the rotary shaft M1 of the motor 60 by cutting. In order to secure coaxial accuracy of the shaft of the first sun gear 12 and the shaft of the outer gear 14, the outer gear 14 and the motor mount 13 are positioned in place by being fitted together. Furthermore, the motor mount 13 is positioned in place by being fitted to a gear mount 24. The gear mount 24 may be a flange.

An end cap 22 is fixed to one end portion of the outer gear 14 opposite the motor mount 13. The end cap 22 is used to prevent the first planetary gears 15, the second planetary gears 18, the first carrier 16, the second carrier 19, and the cylindrical-shaped shaft 20 from falling off from the outer gear 14 when the planetary gear mechanism is mounted on a lateral plate 127 at the motor side. There is a clearance between the end cap 22 and the cylindrical-shaped shaft 20 of the second carrier 19. More specifically, the end cap 22 does not rotatively support the second carrier 19 but instead allows the second carrier 19 to freely float (rotate).

Figure 5:
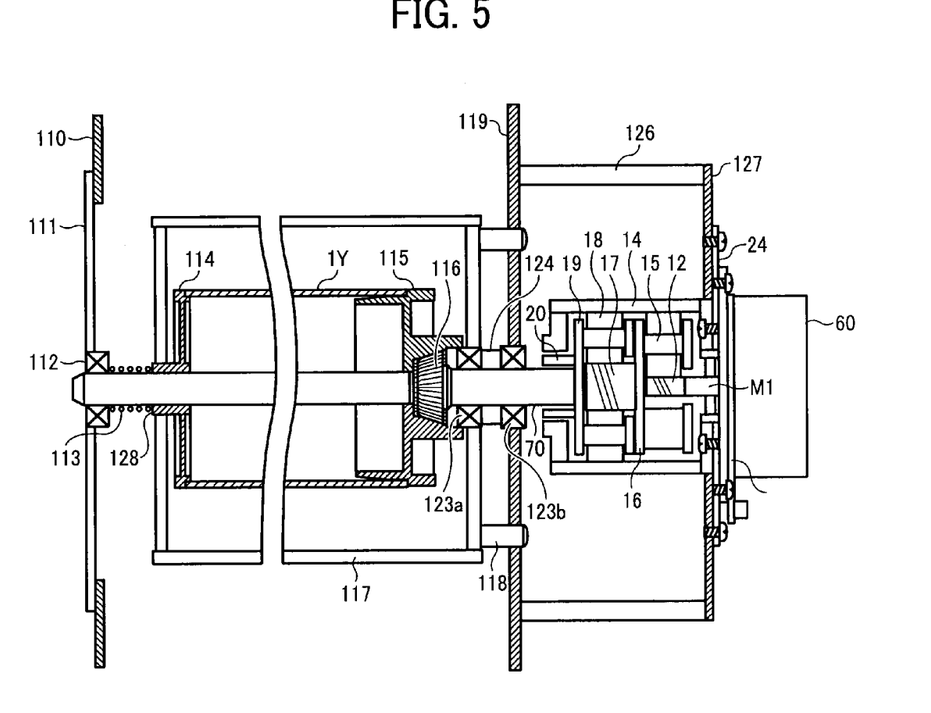
FIG. 5 is a schematic diagram illustrating the planetary gear mechanism and a supporting structure for the photosensitive drum in a process cartridge.

With reference to FIG. 5, a description is provided of support of the photosensitive drum 1 in the process cartridge detachably attachable relative to the main body of the image forming apparatus. FIG. 5 is a cross-sectional view schematically illustrating the photosensitive drum 1Y and the planetary gear decelerator according to the illustrative embodiment of the present invention.

It is to be noted that the photosensitive drums 1Y, 1M, 1C, and 1Bk all have the same configuration as all the others, differing only in the color of toner employed. Thus, the description is only provided of a driving device for the photosensitive drum 1Y. The driving device may be applied to the driving roller of the intermediate transfer belt 5, fixing roller, and so forth.

As illustrated in FIG. 5, a rear drum flange 115 and a front drum flange 114 are fixed to each end portion of the photosensitive drum 1Y in the axial direction thereof. The drum shaft 70 disposed at the main body side penetrates through the rear drum flange 115 and the front drum flange 114 so that the flanges 114 and 115 are supported by the drum shaft 70. The rear drum flange 115 is connected to the drum shaft 70 by a serration coupling 116. The photosensitive drum 1Y rotates in sync with rotation of the drum shaft 70. The serration coupling 116 has a male end at the drum shaft side and a female end at the drum flange side (rear drum flange 115). The serration coupling 116 tapers toward the drum flange 115.

A housing 117 that houses and supports the photosensitive drum 1Y houses also the charging device 2Y, the developing device 9Y, the cleaning device 4Y, and the charge erasing lamp (not illustrated), and so forth. As illustrated in FIG. 5, the rear side (right side in FIG. 5) of the housing 117 is supported by a shaft bearing 123a which is one of the shaft bearings 123 (123a and 123b) fixed to the drum shaft 70. A collar 124 is interposed between the shaft bearings 123a and 123b. The rear drum flange 115 is also supported by the shaft bearing 123a. In this configuration, the rear side of the housing 117 and the rear drum flange 115 are supported by the shaft bearing 123a so that the photosensitive drum 1Y is aligned with the housing 117. The front drum flange 114 includes a boss 128 rotatively fitted with the housing 117 at the front side thereof (left side in FIG. 5).

The shaft bearing 123b is provided to the drum shaft 70 at a place at which the drum shaft 70 is fitted into a main-body rear lateral plate 119. Accordingly, the drum shaft 70 is aligned with the rear lateral plate 119. A main-body front lateral plate 110 includes a notch at which a face plate 111 is fixed. The front end of the drum shaft 70 is rotatively supported by the face plate 111 via a shaft bearing 112.

The process cartridge can be detached by removing the face plate 111. In an installed state in which the process cartridge is mounted, the photosensitive drum 1Y is pressed in the direction of the drum shaft by a pressing spring 113 disposed between the shaft bearing 112 fixed to the face plate 111 and the boss 128 of the front drum flange 114. Accordingly, the photosensitive drum 1Y is positioned in place at the tapered serration coupling 116 in the rotation direction and the thrust direction.

The housing 117 includes two positioning pins 118 at the rear side thereof. The positioning pins 118 are fitted into holes formed in the main-body rear lateral plate 119 so that the process cartridge in the direction of rotation is positioned in place.

Still referring to FIG. 5, a description is provided of installation of the planetary gear mechanism.

The lateral plate 127 of the motor side is attached to the main-body rear lateral plate 119 via studs 126. The gear mount 24 that supports the planetary gear mechanism is fixed to the lateral plate 127 at the motor side. The planetary gear mechanism is positioned in place by fitting the outer gear 14 into a hole formed in the lateral plate 127. Alternatively, the planetary gear mechanism is installed such that the lateral plate 127 serves also as the gear mount 24. As the planetary gear mechanism is attached to the lateral plate 127 at the motor side, the output side of the outer gear 14 is free and therefore easily deformed.

The outer gear 14 needs to be reliably fixed in place to prevent the outer gear 14 from rotating undesirably relative to the gear mount 24 due to torque during operation and generating a high-level vibration caused by propagation of vibration of the motor and vibration upon engagement with the gears. Vibration of the outer gear 14 causes banding.

According to the above-described illustrative embodiment, each of the gears, that is, the outer gear 14, the sun gears 12 and 17, and the planetary gears 15 and 18, are helical gears. Helical gears are advantageous because they can increase the contact ratio and decrease load sharing while moving smoothly.

Although advantageous, in a case in which all of the gears, the outer gear 14, the sun gears 12 and 17, and the planetary gears 15 and 18, are helical gears, a force (thrust load) is generated in the direction of the thrust (direction of the rotary shaft).

Figure 6:
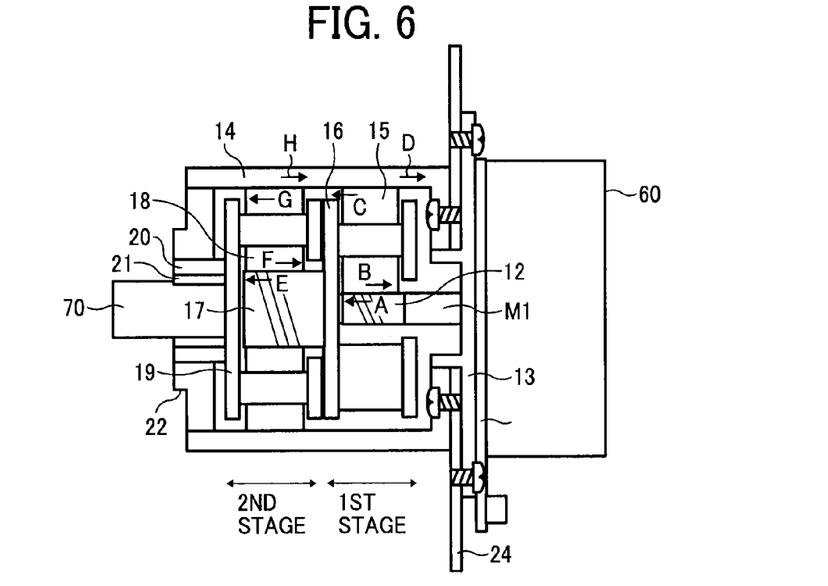
FIG. 6 is a schematic diagram illustrating the planetary gear mechanism and thrust loads acting on each gear.

FIG. 6 illustrates directions of thrust loads acting on each of the gears in the planetary gear mechanism of the illustrative embodiment. FIG. 6 is a schematic diagram illustrating the planetary gear mechanism and thrust loads acting thereon.

In FIG. 6, the first and the second sun gears 12 and 17 have right-hand helical teeth. The first and the second planetary gears 15 and 18 have left-hand helical teeth. The outer gear 14 of the first stage and the second stage has right-hand helical teeth. FIG. 6 shows directions of thrust loads when the gears engage and the direction of rotation of the input axis (the motor) coincides with a counterclockwise direction as viewed from the output (the drum shaft) side.

As illustrated in FIG. 6, as the first sun gear 12 engages the first planetary gears 15, a thrust load in the direction of arrow A acts on the first sun gear 12. A thrust load in the direction of arrow B acts on the first planetary gears 15. As the first planetary gears 15 engage the outer gear 14, a thrust load in the direction of arrow C acts on the first planetary gears 15. A thrust load in the direction of arrow D acts on the outer gear 14.

Similarly, in the second stage of the planetary gear mechanism, a thrust load in the direction of arrow E acts on the second sun gear 17. Thrust loads in the directions indicated by arrows F and G act on the second planetary gears 18. A thrust load in the direction of arrow H acts on the outer gear 14.

However, in the present embodiment, because the first sun gear 12 is formed directly on the motor shaft MI by cutting the motor shaft M1 and the motor 60 is fixed to the motor mount 13, the sun gear 12 does not move in the direction of arrow A even when the thrust load in the direction of arrow A acts on the first sun gear 12.

The direction of a slice load acting on the first planetary gears 15 due to engagement with the first sun gear 12 is opposite to the direction of the thrust load acting on the first planetary gears 15 due to engagement with the outer gear 14. The amount of the slice load acting on the first planetary gears 15 due to engagement with the first sun gear 12 is almost the same as the amount of the thrust load acting on the first planetary gears 15 due to engagement with the outer gear 14. Therefore, the thrust load and the slice load acting on the first planetary gears 15 cancel one another so that the first planetary gears 15 do not move in the direction of thrust.

Similarly, the thrust load acting on the second planetary gears 18 due to engagement with the second sun gear 17 and the thrust load acting on the second planetary gears 18 due to engagement with the outer gear 14 cancel one another so that the second planetary gears 18 do not move in the direction of thrust.

Although a thrust load toward the motor 60 acts on the outer gear 14 due to engagement with the first planetary gears 15 and the second planetary gears 18, the outer gear 14 does not move because the outer gear 14 is fixed to the gear mount 24.

The thrust load E acts on the second sun gear 17 due to engagement with the second planetary gears 18. As described above, the second sun gear 17 is fixed to the first carrier 16. The first carrier 16 is not equipped with the rotary supporting portion. Instead, the first carrier 16 allows the second sun gear 17 to float (rotate) freely. As a result, the thrust load acting on the second sun gear 17 due to engagement with the second planetary gears 18 causes the second sun gear 17 (in reality, the second sun gear 17, the first carrier 16, and the first planetary gears 15 together) to move to the output side, and hence the end portion of the second sun gear 17 contacts the surface of the second carrier 19, pushing the second carrier 19 toward the output side.

However, the second carrier 19 does not move to the output side even when the second sun gear 17 pushes the second carrier 19, because the movement of the second carrier 19 in the direction of thrust is restricted by the drum shaft 70 fixed to the housing lateral plate via the cylindrical-shaped shaft 20 such that the drum shaft 70 does not move in the axial direction.

As described above, in a case in which each of the gears is helical gears, the second sun gear 17 contacts the surface of the second carrier 19 during rotation transmission. Because the second carrier 19 rotates slower than the second sun gear 17, there is a difference in speed between the second carrier 19 and the second sun gear 17. As a result, rotational friction occurs between the second sun gear 17 and the second carrier 19 when the second sun gear 17 and the second carrier 19 contact, causing loss of power and abrasion.

In a case in which the cleaning device 4 employs a blade pressing against the surface of the photosensitive drum 1 to clean the surface thereof, the photosensitive drum 1 is rotated in the opposite direction periodically. In this case, the direction of rotation of the input axis (motor) becomes the clockwise direction as viewed from the output (drum shaft) side, and the direction of thrust load becomes opposite to the direction shown in FIG. 6.

As a result, the second sun gear 17, the first carrier 16, and the first planetary gears 15 together (hereinafter referred to collectively as a moving body T) move to the input side or the motor side, thereby causing the first carrier 16 to come into contact with the first sun gear 12 and thus producing heat and abrasion therebetween. As described above, when the photosensitive drum 1 is rotated in the opposite direction, heat abrasion occurs between the first sun gear 12 and the first carrier 16.

It is to be noted that the reason for rotating the photosensitive drum 1 in the opposite direction periodically is as follows. In order to effectively remove residual toner remaining on the photosensitive drum 1, the blade of the cleaning device 4 is pressed against the surface of the photosensitive drum 1 with the leading edge of the blade facing against the direction of rotation of the photosensitive drum 1. In such a case, the blade may be curled undesirably.

In view of the above, the photosensitive drum 1 is rotated in the opposite direction periodically to prevent curling of the blade. Similarly, if the same cleaning device is employed to clean the intermediate transfer belt 5, the intermediate transfer belt 5 needs to be rotated in the opposite direction periodically.

Figure 7:
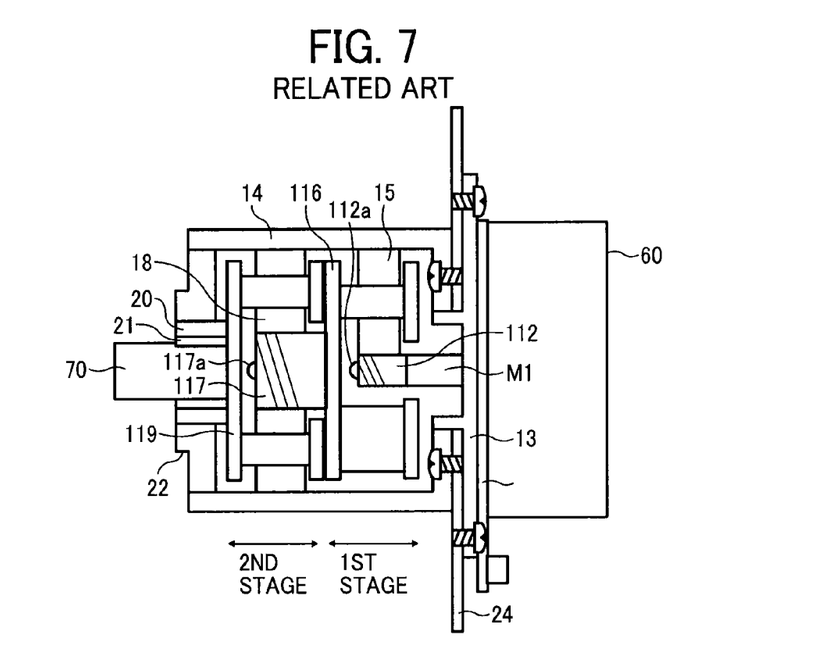
FIG. 7 is a schematic diagram illustrating a conventional planetary gear mechanism.

In order to facilitate an understanding of the novel features of the present invention, as a comparison a description is provided of a conventional planetary gear mechanism with reference to FIG. 7. FIG. 7 is a cross-sectional view schematically illustrating the conventional planetary gear mechanism.

Conventionally, as illustrated in FIG. 7, a portion of a second sun gear 117 at the center of rotation thereof projects by approximately 1 mm beyond the edge portion of the gear, and the tip of the projection is made spherical. This projection is denoted by reference numeral "117a" in FIG. 7. With this configuration, the contact area of the second sun gear 117 contacting the surface of a second carrier 119 is reduced, thereby reducing rotation resistance and friction therebetween during rotation, and hence preventing loss of power. Similarly, a projection 112a is provided to a first sun gear 112 so that the contact area of the first sun gear 112 contacting the surface of a first carrier 116 is reduced during reverse rotation, thereby reducing rotation resistance and friction therebetween during rotation and hence preventing loss of power.

Although advantageous, the tips of the projections 112a and 117a are still worn down over time because the projections 112a and 117a contact the first and second carriers 116 and 119 with the thrust force while rotating. As a result, the contact area of the tips of the projections 112a and 117a with respect to the carriers 116 and 119 increases gradually. In other words, the rotation resistance cannot be reliably reduced after extended use.

To address this difficulty, grease can be applied to the tips of the projections 112a and 117a. However, the grease spatters due to the centrifugal force generated during rotation of the sun gears and the carriers and is dried out eventually.

In view of the above, according to an illustrative embodiment, grease retaining portions for keeping the grease therein are provided near the contact portions of the sun gears and the carriers as a contact member contacting the sun gear, thereby providing the contact portions with a constant supply of grease.

[Embodiment 1]

Figure 8:
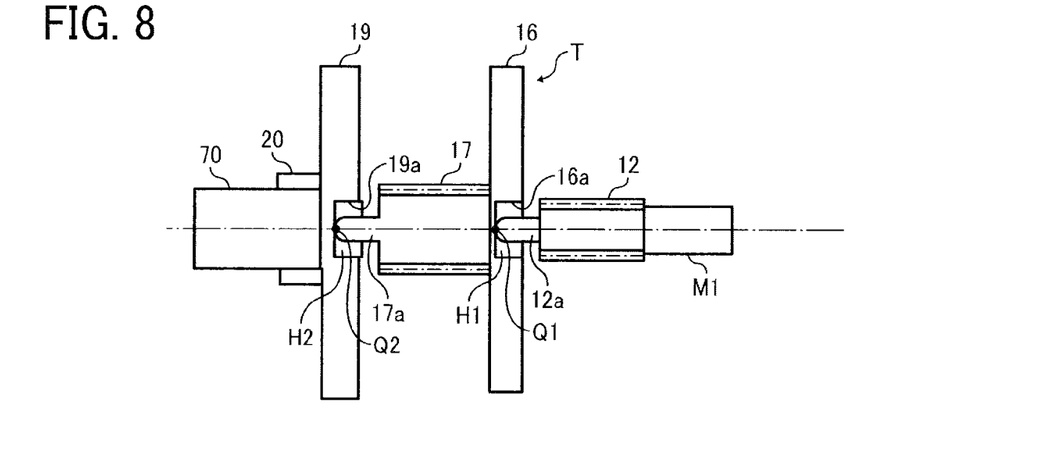
FIG. 8 is a cross-sectional view schematically illustrating the planetary gear mechanism and a grease retaining portion according to a first illustrative embodiment of the present invention.

With reference to FIG. 8, a description is provided of the grease retaining portions H1 and H2 according to a first illustrative embodiment. FIG. 8 is a cross-sectional view schematically illustrating the planetary gear mechanism and grease retaining portions H1 and H2.

As illustrated in FIG. 8, a first concave portion 16a having a cylindrical shape is formed in the surface of the first carrier 16 facing the first sun gear 12, at the center of rotation thereof. The center of rotation of the first sun gear 12 includes a projection 12a having a spherical tip (hereinafter referred to as first projection). The length of the first projection 12a in the direction of thrust is longer than a depth of the first concave portion 16a, and a portion of the first projection 12a protrudes into the first concave portion 16a. A space between the bottom of the first concave portion 16a and the tip of the first projection 12a is filled in with the grease, thereby forming the first grease retaining portion H1 around the first projection 12a.

A second concave portion 19a having also a cylindrical shape is formed in the surface of the second carrier 19 facing the second sun gear 17, at the center of rotation thereof. The center of rotation of the second sun gear 17 includes a spherical projection 17a (hereinafter referred to as second projection). The length of the second projection 17a in the direction of thrust is longer than a depth of the second concave portion 19a, and a portion of the second projection 17a is inside the second concave portion 19a. The space between the bottom of the second concave portion 19a and the tip of the second projection 17a is filled in with the grease, thereby forming the second grease retaining portion H2 around the second projection 17a.

As the motor shaft M1 rotate in the normal direction, the second planetary gears 18 and the second sun gear 17 engage and a thrust load acts on the second sun gear 17 in the direction of the output axis, causing the moving body T to move to the output side. As a result, the tip of the second projection 17a of the second sun gear 17 contacts a portion of the second concave portion 19a of the second carrier 19 at the center of rotation thereof. At this time, the second grease retaining portion H2 is formed around a contact portion Q2 at which the second carrier 19 and the second sun gear 17 contact so that the grease is provided around the contact portion Q2. With this configuration, the contact portion Q2 is always supplied with the grease, thereby preventing friction resistance at the contact portion Q2 for an extended period of time and hence reducing power loss.

As the motor shaft M1 rotate in the opposite direction, the second planetary gears 18 and the second sun gear 17 engage and a thrust load acts on the second sun gear 17 in the direction of the input axis, causing the moving body T to move to the input axis side. As a result, the tip of the first projection 12a of the first sun gear 12 contacts the center of rotation of the first concave portion 16a of the first carrier 16.

At this time, the first grease retaining portion H1 is formed around a contact portion Q1 at which the first carrier 16 and the second sun gear 12 contact so that the grease is provided around the contact portion Q1. With this configuration, the contact portion Q1 is always supplied with the grease, thereby preventing friction resistance at the contact portion Q1 for an extended period of time and hence reducing power loss.

Figure 9:
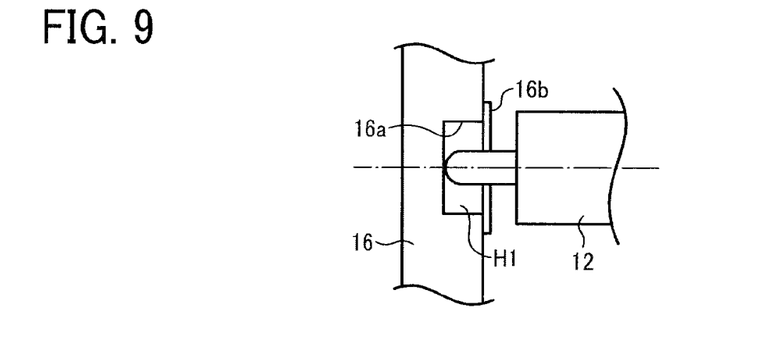
FIG. 9 is a partially enlarged schematic diagram illustrating a variation of the grease retaining portion shown in FIG. 8.

The grease borne by the grease retaining portions H1 and H2 has high viscosity. Hence, the grease is less likely to leak from the grease retaining portions H1 and H2. Therefore, the first and the second grease retaining portions H1 and H2 can be open, or exposed, to release the heat generated by friction at the contact portions at which the carriers contact the sun gears. Alternatively, as illustrated in FIG. 9, the first grease retaining portion H1 may be sealed with a sealing member 16b. FIG. 9 is a schematic diagram illustrating a variation of the grease retaining portion H1. With this configuration, the grease fed to the first grease retaining portion H1 is reliably prevented from spattering so that the contact portion Q1, at which the first carrier 16 contacts the first sun gear 12, is prevented from running out of grease for an extended period of time.

It is to be noted that, although not illustrated, similar to the first grease retaining portion H1, the second grease retaining portion H2 may be sealed with the sealing member.

As described above, when the thrust load acts on the second sum gear 17, the moving body T is moved, causing the projection of the sun gear to contact the concave portion of the carrier. Alternatively, the projection of the sun gear may initially be in contact with the concave portion of the carrier.

According to the first illustrative embodiment, the carriers include the concave portions and the center of rotation of the sun gears includes the projections. Alternatively, the center of the rotation of the sun gears may include the concave portion and the center of rotation of the carriers may include the projection. In this configuration, the same effect as that of the first illustrative embodiment can be obtained. Whether the concave portion is provided to the carriers or the sun gears can be determined depending on complexity of manufacture and processing.

[Embodiment 2]

Figure 10:
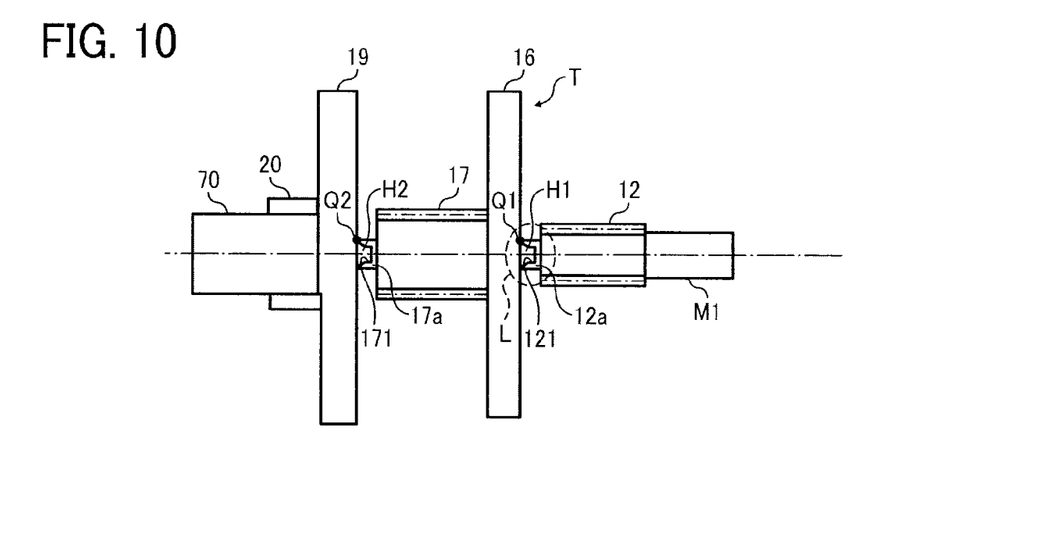
FIG. 10 is a cross-sectional view schematically illustrating the planetary gear mechanism and the grease retaining portions according to a second illustrative embodiment of the present invention.
Figure 11:
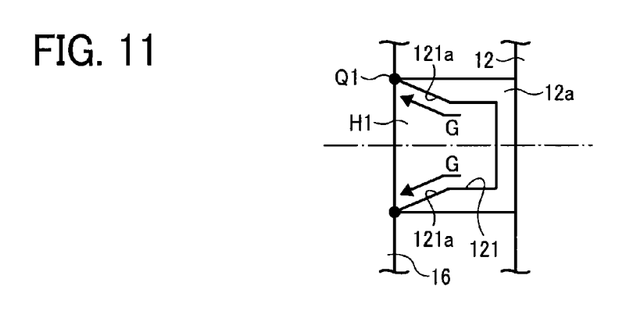
FIG. 11 is a partially enlarged schematic diagram illustrating a section L indicated by a broken-line circle in FIG. 10.

With reference to FIGS. 10 and 11, a description is provided of a second illustrative embodiment. FIG. 10 is a cross-sectional view schematically illustrating the planetary gear mechanism according to the second illustrative embodiment. FIG. 11 is an enlarged view schematically illustrating a section L indicated by a broken-line circle shown in FIG. 10.

As illustrated in FIGS. 10 and 11, according to the second illustrative embodiment, the first projection 12a includes a cylindrical concave portion 121 at the center of rotation of the first sun gear 12. The grease is supplied to the concave portion 121, thereby forming the first grease retaining portion H1. Similar to the first sun gear 12, the second projection 17a includes a cylindrical concave portion 171 at the center of rotation of the second sun gear 17. The grease is supplied to the concave portion 171, thereby forming the second grease retaining portion H2.

As illustrated in FIG. 11, the diameter of the inner circumference 121a of the concave portion 121 of the first projection 12a increases outward toward the rim. In other words, the concave portion 121 tapers inward toward the opposite side to the rim.

Although not illustrated, the diameter of the inner circumference of the concave portion 171 of the second projection 17a increases outward toward the rim. In other words, the concave portion 171 tapers inward toward the opposite side to the rim. Preferably, the rim of the concave portions 121 and 171 has a curved surface so that the rim contacts the carrier in a line and not over a plane. With this configuration, the contact area at which the rim and the carrier contact is reduced, thereby reducing rotational friction.

As illustrated in FIG. 11, as the motor shaft M1 rotates in the opposite direction, the rim of the concave portion 121 of the first projection 12a contacts the surface of the first carrier 16 at the first sun gear side.

According to the present second illustrative embodiment, the center of rotation of the first sun gear 12 is closer to the grease retaining portion H1 than to the contact portion Q1 at which the first sun gear 12 and the first carrier 16 contact. Due to the centrifugal force by rotation of the first sun gear 12 and the first carrier 16, the grease in the first grease retaining portion H1 moves easily to the outside of the center of rotation. Because the center of rotation of the first sun gear 12 is closer to the first grease retaining portion H1 than to the contact portion Q1, the grease in the first grease retaining portion H1 is gathered at the contact portion Q1 due to the centrifugal force. Accordingly, the grease can be supplied adequately to the contact portion Q1 without filling up the first grease retaining portion H1 with grease.

As described above, the diameter of the inner circumferential surface of the concave portion 121 of the first projection 12a increases toward the rim. That is, the concave portion 121 has a tapered shape. Accordingly, due to the centrifugal force, the grease in the first grease bearing member H1 moves to the contact portion Q1 in the direction indicated by arrow G This configuration provides a more reliable supply of grease to the contact portion Q1.

The first grease retaining portion H1 is sealed with the first sun gear 12 and the first carrier 16, thereby preventing the grease from spattering.

In a case in which the motor shaft M1 rotates in the normal direction and the rim of the concave portion 171 of the second projection 17a contacts the surface of the second carrier 19 at the second sun gear side, because the contact portion Q2 at which the second sun gear 17 and the second carrier 19 contact is outside the second grease retaining portion H2 relative to the center of rotation of the second sun gear 17, the grease in the second grease retaining portion H2 is gathered at the contact portion Q2 due to the centrifugal force. This configuration also prevents the contact portion Q2 from running out of the grease over time. Accordingly, while the motor shaft M1 rotates in the normal direction, power loss due to rotational friction is reduced for an extended period of time.

Figure 12:
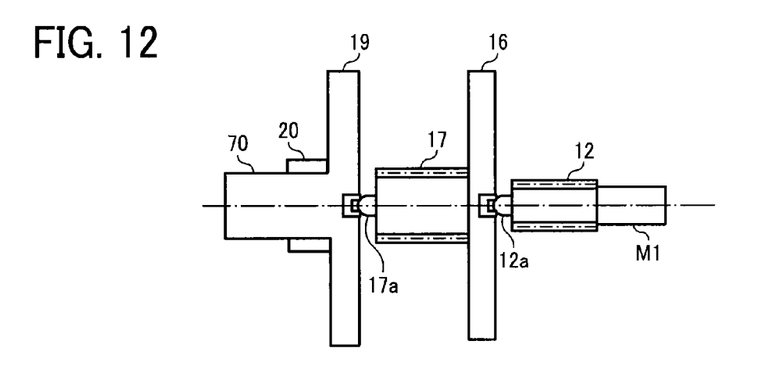
FIG. 12 is a cross-sectional view schematically illustrating a variation of the grease retaining portion of the second illustrative embodiment.

Alternatively, as illustrated in FIG. 12, each of the carriers may include the concave portion at the center of rotation thereof, and each of the sun gears may include the projection having a spherical tip at the center of rotation thereof. With this configuration, the spherical tip of the sun gears contact the rim of the concave portions of the carriers, and the contact portions where the sun gears contact the carriers can be outside the grease retaining portions relative to the center of rotation.

Although not illustrated, an opposite configuration to the configuration shown in FIG. 10 may be employed. That is, each of the carriers may include the projection at the center of rotation thereof, and each of the projections may include the cylindrical concave portion.

Alternatively, an opposite configuration to the configuration shown in FIG. 12 may be employed. That is, each of the sun gears may include the cylindrical concave portion at the center of rotation thereof, and each of the carriers may include the projection having a spherical tip at the center of rotation thereof.

Figure 13:
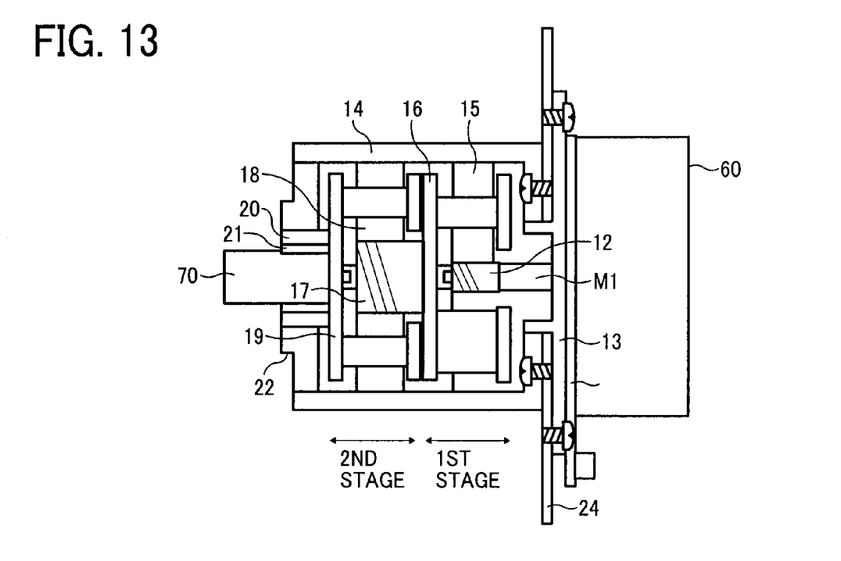
FIG. 13 is a cross-sectional view schematically illustrating another variation of the grease retaining portion of the second illustrative embodiment.

Which configuration to employ may be determined depending on the complexity of manufacture and processing. Preferably, as illustrated in FIG. 13, the first carrier 16 and the second sun gear 17 include the concave portions. This is because the first sun gear 12 serving as an input axis of the first stage at the extreme upstream end in the direction of power transmission has a relatively small diameter in order to achieve a high deceleration ratio. Having a small diameter includes the concave portion at the center of rotation can weaken the first sun gear 12.

Moreover, the first sun gear 12 is formed on the metal motor shaft M1 such that the gear teeth are formed by cutting directly the motor shaft M1 or a metal gear is pressed into the motor shaft M1. Forming the concave portion at the center of rotation of the motor shaft made of metal is costly. Therefore, preferably, the first carrier 16 includes the concave portion at the contact portion at which the first carrier 16 contacts the first sun gear 12, and the first grease retaining portion H1 is formed at the first carrier side.

By contrast, because the second sun gear 17 disposed at the extreme downstream end in the direction of power transmission is at the output side, its durability is one of its most desirable properties for the second sun gear 17, more so than the deceleration ratio. Thus, the diameter of the second sun gear 17 is relatively large. More specifically, the diameter of the second sun gear 17 is larger than that of the first sun gear 12. With this configuration, even when the second sun gear 17 includes the concave portion at the center of rotation, durability is still maintained.

According to the present embodiment, the second sun gear 17 and the first carrier 16 are constituted as a single molded resin member so that the concave portion can be formed using a mold at low cost. With this configuration, the durability can be maintained at low cost.

[Embodiment 3]

Figure 14:
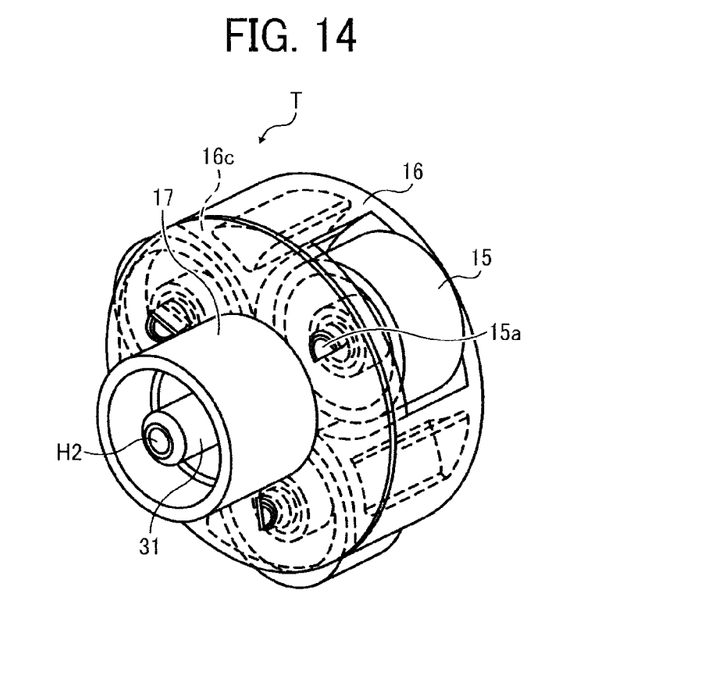
FIG. 14 is a perspective view schematically illustrating a moving body including a second sun gear, a first carrier, and first planetary gears according to a third illustrative embodiment of the present invention.
Figure 15:
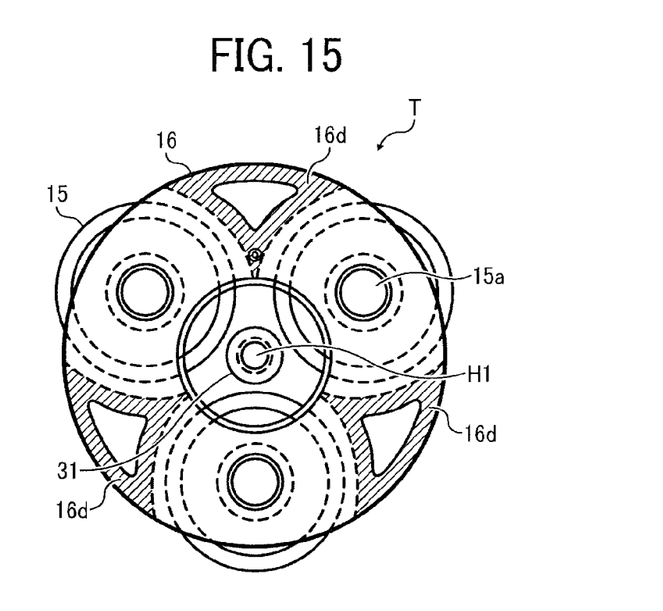
FIG. 15 is an elevational view schematically illustrating the moving body shown in FIG. 14 as viewed from the first sun gear.
Figure 16:
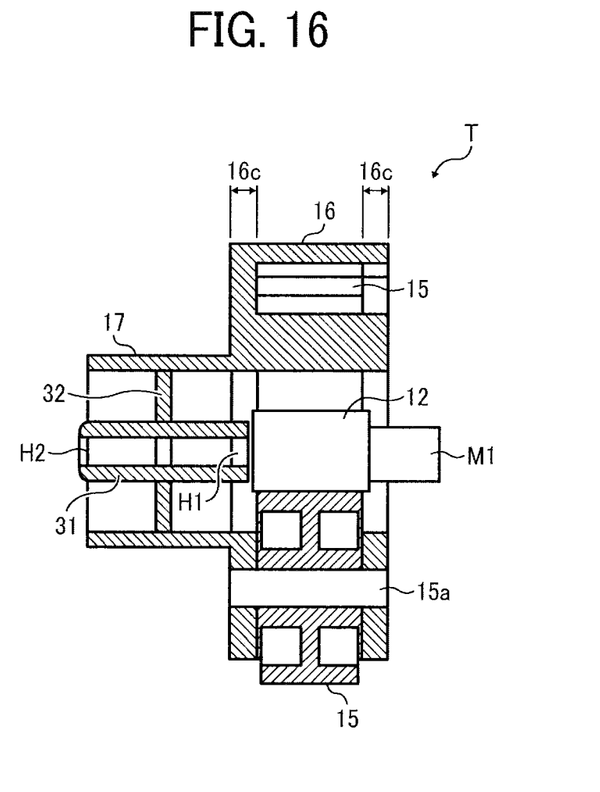
FIG. 16 is a cross-sectional view schematically illustrating the moving body.

With reference to FIGS. 14 through 16, a description is provided of another illustrative embodiment. FIG. 14 is a perspective view schematically illustrating the moving body T including the second sun gear 17, the first carrier 16, and the first planetary gears 15 according to a third illustrative embodiment. FIG. 15 is an elevational view schematically illustrating the moving body T as viewed from the first sun gear 12 according to the third illustrative embodiment. FIG. 16 is a cross-sectional view schematically illustrating the moving body T according to the third illustrative embodiment.

According to the third illustrative embodiment, the moving body T includes a through hole 31 penetrating through the center of rotation of the moving body T including the second sun gear 17, the first carrier 16, and the first planetary gears 15. The through hole 31 is filled in with the grease to form the grease retaining portions H1 and H2.

The leading edge of the through hole 31 at the first sun gear side projects beyond the lateral surface of the first carrier 16 at the first sun gear side by approximately 1 mm. The leading edge of the through hole 31 at the second carrier side projects beyond the second sun gear 17 by approximately 1 mm.

According to the present embodiment, when the motor shaft M1 rotates in the normal direction, the rim of the through hole 31 at the second carrier side contacts the second carrier 19. Similar to the foregoing embodiments, according to the third illustrative embodiment, the center of rotation is closer to the second grease retaining portion H2 than to the contact portion at which the second sun gear 17 (the rim the through hole 31 at the second carrier side) contacts the second carrier 19. With this configuration, the centrifugal force causes the grease in the second grease retaining portion H2 to move to the contact portion, thereby constantly lubricating the contact portion.

By contrast, when the motor shaft M1 rotates in the opposite direction, the rim of the through hole 31 at the first sun gear side contacts the first sun gear 12. According to the present embodiment, the center of rotation of the first sun gear 12 is closer to the first grease retaining portion H1 than to the contact portion at which the first sun gear 12 (the rim of the through hole 31 at the first carrier side) contacts the first carrier 16. With this configuration, the centrifugal force causes the grease in the first grease retaining portion H1 to move to the contact portion at which the first sun gear 12 contacts the first carrier 16, thereby constantly lubricating the contact portion.

As illustrated in FIG. 16, the rim of the through hole 31 has a semicircular shape in cross section so that the rim contacts the contact member (the second carrier 19 or the first sun gear 12) in a line rather than across a plane, thereby reducing rotational friction.

According to the third illustrative embodiment, the diameter of the inner circumferential surface of the through hole 31 increases outwardly toward the rim. In other words, the through hole 31 has an inwardly tapered shape. With this configuration, the grease can move to the contact portion due to the centrifugal force, constantly lubricating the contact portion.

The second sun gear 17, the first carrier 16, and the through hole 31 may be constituted as a single molded resin member made through injection molding or the like. The first carrier 16 consists of two lateral plates 16c and three supports 16d disposed equally spaced around the circumference and between the lateral plates 16c, thereby connecting the lateral plates 16c. The planetary gears 15 are disposed between the supports 16d, and both ends of a carrier pin 15a supporting the planetary gear 15 are supported by the lateral plates 16c of the carrier 16. The lateral plates 16c include holes through which the carrier pins 15a are inserted.

The first planetary gears 15 and the first carrier 16 are assembled such that the first planetary gears 15 are disposed between the supports 16c and then the carrier pins 15a are inserted from the holes of one of the lateral plates 16c through the first planetary gears 15 into the holes of the other lateral plate 16c.

To facilitate assembly of the first planetary gears 15 and the first carrier 16, the first carrier 16 may be constituted of two separable parts, that is, a first lateral plate at the first sun gear side and a second lateral plate including the second sun gear 17. In this case, after one end of the carrier pin 15a constituted as a single integrated unit with the first sun gear 15 is fitted into the hole of one of the lateral plates, the other end of the carrier pin 15a is fitted into the hole of the other lateral plate, connecting the first and the second lateral plates via the supports 16d. Accordingly, the first planetary gears 15 and the first carrier 16 are assembled.

With this configuration, the second sun gear 17 and the first carrier 16 are a single integrated molded resin member. With this configuration, the center of rotation of the first carrier 16 and the center of rotation of the second sun gear 17 are coaxial, and transfer stiffness can be increased.

As illustrated in FIG. 16, the through hole 31 is connected to the second sun gear 17 by a rib 32 so that the through hole 31 does not shift in the direction of thrust in the second sun gear 17. This configuration is critical to prevent vibration caused by contact due to the thrust movement and rotation from affecting engagement of the second sun gear 17.

Even when the through hole 31 expands thermally due to rotational friction of the rim of the through hole 31 contacting the contact member (the first sun gear 12 or the second carrier 19), the impact of thermal expansion on the second sun gear 17 can be reduced by connecting the through hole 31 and the second sun gear 17 by the rib 32.

As described above, according to the third illustrative embodiment, the through hole 31 penetrates through the moving body T, and the through hole 31 is filled in with the grease, thereby forming the grease retaining portions H1 and H2. With this configuration, the grease retaining portions H1 and H2 are filled in with the grease with only one step, and simplification and cost reduction of manufacturing process are achieved.

When one end (rim) of the through hole 31 contacts the contact member (the second carrier 19 or the first sun gear 12), the other end of the through hole 31 is separated from the contact member. With this configuration, heat generated by rotational friction at the contact portion is released from the other end, preventing the temperature of the through hole 31 from rising significantly.

The foregoing descriptions pertain to a two-stage planetary gear mechanism. However, the present invention is not limited to the two-stage planetary gear mechanism, and is applicable to a planetary gear mechanism having more than two stages. Furthermore, the present invention can be applied to a single-stage planetary gear mechanism in which a sun gear is movable in the direction of thrust.

In an aspect of this disclosure, there is provided an improved drive transmission unit including a planetary gear mechanism. The planetary gear mechanism includes an outer gear, a sun gear, a plurality of planetary gears, a carrier, a contact member, and a grease retaining portion. The outer gear is rotatably disposed on a shaft. The sun gear is rotated by a power source and coaxially disposed on the same shaft as the outer gear. The plurality of planetary gears is disposed along an inner circumferential surface of the outer gear and engages the sun gear and the outer gear. The carrier is rotatable on the same shaft as the sun gear and the outer gear, and rotatably supports the planetary gears. The contact member contacts the sun gear as the sun gear moves in a direction of thrust due to engagement with the plurality of planetary gears. The grease retaining portion retains grease near a contact portion at which the sun gear contacts the contact member as the sun gear moves in the direction of thrust due to engagement with the plurality of planetary gears. The outer gear, the sun gear, and the plurality of planetary gears are helical gears.

In another aspect of the disclosure, the drive transmission unit includes a plurality of the planetary gear mechanisms arranged in series in the axial direction and a power output member to transmit power from the power source to a rotary member, connected to the carrier of the planetary mechanism at the extreme downstream end in the direction of power transmission. The sun gear of the planetary gear disposed at the extreme upstream end in the direction of power transmission is connected to the power source, and the carrier of the planetary gear mechanism other than the one disposed at the extreme downstream end in the direction of power transmission and the sun gear of the planetary gear mechanism adjacent to and downstream from the carrier are constituted as a single integrated member. As the sun gear constituted as the single integrated member with the carrier moves in the direction of thrust due to engagement with the planetary gears, the sun gear contacts the contact member, and the grease retaining portion is formed near the contact portion at which the sun gear contacts the contact member. The contact member is the carrier that contacts the sun gear as the sun gear moves in a direction of thrust due to engagement with the plurality of planetary gears.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A drive transmission unit comprising a planetary gear mechanism, the planetary gear mechanism comprising:
a sun gear rotated by a power source, the sun gear rotatably disposed on a shaft of the power source;
an outer gear coaxially disposed about the shaft;
a plurality of planetary gears to engage the sun gear and the outer gear, the plurality of planetary gears disposed along an inner circumferential surface of the outer gear;

a carrier to rotatably support the planetary gears, the carrier coaxially rotatable about the shaft;

a contact member that contacts the sun gear as the sun gear moves in a direction of thrust due to engagement with the plurality of planetary gears; and a grease retaining portion to retain grease around a contact portion at which the sun gear contacts the contact member as the sun gear moves in the direction of thrust due to engagement with the plurality of planetary gears, wherein the outer gear, the sun gear, and the plurality of planetary gears are helical gears, and wherein the sun gear includes the grease retaining portion having a cylindrical concavity, and a rim of the grease retaining portion contacts the contact member.

2. The drive transmission unit according to claim 1, wherein the grease retaining portion is formed adjacent the contact portion at which the contact member and the sun gear contact.

3. The drive transmission unit according to claim 2, wherein the grease retaining portion is a space within the cylindrical concavity.

4. The drive transmission unit according to claim 3, further comprising a sealing member to seal the grease retaining portion.

5. The drive transmission unit according to claim 1, wherein the contact portion of the sun gear and the contact member is outboard of the grease retaining portion relative to the center of rotation of the sun gear.

6. The drive transmission unit according to claim 1, wherein a diameter of an inner circumferential surface of the grease retaining portion increases toward the rim of the grease retaining portion.

7. The drive transmission unit according to claim 1, further comprising:

a plurality of the planetary gear mechanisms arranged in series in the axial direction; and a power output member to transmit power from the power source to a rotary member, connected to the carrier of the planetary mechanism at the extreme downstream end in the direction of power transmission, wherein the sun gear of the planetary gear disposed at the extreme upstream end in the direction of power transmission is connected to the power source, and the carrier of the planetary gear mechanism other than the one disposed at the extreme downstream end in the direction of power transmission and the sun gear of the planetary gear mechanism adjacent to and downstream from the carrier are constituted as a single integrated member, wherein as the sun gear constituted as the single integrated member with the carrier moves in the direction of thrust due to engagement with the planetary gears, the sun gear contacts the contact member, and the grease retaining portion is formed within the cylindrical concavity at which the sun gear contacts the contact member, wherein the contact member is the carrier that contacts the sun gear as the sun gear moves in a direction of thrust due to engagement with the plurality of planetary gears.

8. The drive transmission unit according to claim 7, wherein the single integrated member comprised of the carrier and the sun gear is injection-molded with plastic.

9. An image forming apparatus, comprising:

a rotary member; and the drive transmission unit of claim 1 to transmit torque from the power source to the rotary member to drive the rotary member.

10. A drive transmission unit comprising a planetary gear mechanism, the planetary gear mechanism comprising:

a sun gear rotated by a power source, the sun gear rotatably disposed on a shaft of the power source;

an outer gear coaxially disposed about the shaft;

a plurality of planetary gears to engage the sun gear and the outer gear, the plurality of planetary gears disposed along an inner circumferential surface of the outer gear;

a carrier to rotatably support the planetary gears, the carrier coaxially rotatable about the shaft;

a contact member that contacts the sun gear as the sun gear moves in a direction of thrust due to engagement with the plurality of planetary gears; and a grease retaining portion to retain grease around a contact portion at which the sun gear contacts the contact member as the sun gear moves in the direction of thrust due to engagement with the plurality of planetary gears, wherein the outer gear, the sun gear, and the plurality of planetary gears are helical gears, and wherein the contact member includes the grease retaining portion having a cylindrical concavity formed therein, and the sun gear contacts the rim of the grease retaining portion.

11. The drive transmission unit according to claim 10, wherein the grease retaining portion is formed adjacent the contact portion at which the contact member and the sun gear contact.

12. The drive transmission unit according to claim 10, wherein the grease retaining portion is a space within the cylindrical concavity.

\* \* \* \* \*